(12) United States Patent
Eftekhar et al.

(10) Patent No.: US 12,341,560 B2
(45) Date of Patent: Jun. 24, 2025

(54) OPTICAL COHERENT TRANSMITTER ON A SILICON CHIP

(71) Applicant: Intel Corporation, Santa Clara, CA (US)

(72) Inventors: Aliasghar Eftekhar, San Jose, CA (US); Duanni Huang, San Jose, CA (US); Meer Nazmus Sakib, Berkeley, CA (US); Haisheng Rong, Pleasanton, CA (US); Ansheng Liu, Cupertino, CA (US); Peicheng Liao, Santa Clara, CA (US); Hao Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 962 days.

(21) Appl. No.: 17/180,529

(22) Filed: Feb. 19, 2021

(65) Prior Publication Data

US 2021/0175974 A1    Jun. 10, 2021

(51) Int. Cl.
H04B 10/50    (2013.01)

(52) U.S. Cl.
CPC .................................. *H04B 10/503* (2013.01)

(58) Field of Classification Search
CPC ...... H04B 10/503; H04B 10/50; H04B 10/40; H04B 10/60; H04B 10/801; H04B 10/61; H04B 10/5053; H04B 10/5055; H04B 10/5057; H04B 10/5059; H04B 10/5051; H04B 10/505; H04B 10/50597; H04B 10/532; H04B 10/548; G02F 1/212; G02F 1/395; G02F 1/225; G02B 6/126
See application file for complete search history.

(56) References Cited

U.S. PATENT DOCUMENTS

| | | |
|---|---|---|
| 9,791,761 B1 | 10/2017 | Li et al. |
| 10,754,091 B1 * | 8/2020 | Nagarajan .................. H01S 3/13 |
| 2014/0270618 A1 * | 9/2014 | Dinu ....................... G02F 1/225 |
| | | 385/3 |

(Continued)

OTHER PUBLICATIONS

High Yield Chip-on-wafer Low Temperature Plasma Activated Bonding for III-V/Si Hybrid Photonic Integration: Takehiko Kikuchi1,2, Liu Bai2, Takuya Mitarai2 , Hideki Yagi1 , Tomohiro Amemiya2,3, Nobuhiko Nishiyama2,3, and Shigehisa Arai2,: @ May 21-25, 2019 (Year: 2019).*

(Continued)

*Primary Examiner* — Hibret A Woldekidan
(74) *Attorney, Agent, or Firm* — Schwabe, Williamson & Wyatt, P.C.

(57) ABSTRACT

Embodiments described herein may be related to apparatuses, processes, and techniques related to fully integrated optical coherent modulators on a silicon chip. These coherent modulators may be used to enable transmitters, receivers, transceivers, tunable lasers and other optical or electro-optical devices to be integrated on a silicon chip. In embodiments, the optical coherent modulators may be based on differential microring modulators that may be nested in a Mach-Zehnder Interferometer (MZI) configuration. Embodiments may also be directed to a miniaturized and fully integrated coherent modulators, which can enable terabit per second (Tbps) transceivers in a small form factor based on coherent modulation on a silicon chip. Other embodiments may be described and/or claimed.

18 Claims, 8 Drawing Sheets

(56) References Cited

U.S. PATENT DOCUMENTS

| | | | |
|---|---|---|---|
| 2017/0090267 A1* | 3/2017 | O'Sullivan | H04B 10/516 |
| 2018/0143460 A1* | 5/2018 | Wen | G02B 27/286 |
| 2020/0200975 A1* | 6/2020 | Ma | G02F 1/225 |

OTHER PUBLICATIONS

Dong, Po, et al. "Monolithic Silicon Photonic Integrated Circuits for Compact 100Gb/s Coherent Optical Receivers and Transmitters." IEEE Journal of Selected Topics in Quantum Electronics 20.4 (2014): pp. 150-157.

J. Zhou et al., "Silicon Photonics Carrier Depletion Modulators Capable of 85Gbd 16QAM and 64Gbd 64QAM," Optical Fiber Conference (OFC) 2019, paper Tu2H.2, San Diego, CA (Mar. 2019), 3 pages.

Sun, Jie, et al. "A 128 GB/s PAM4 Silicon Microring Modulator with Integrated Thermo-Optic Resonance Tuning." Journal of Lightwave Technology 37.1 (2019): pp. 110-115.

Dong, Po, et al. "Silicon Microring Modulators for Advanced Modulation Formats." Optical Fiber Communication Conference. Optical Society of America, 2013.

Cardenas, Jaime, et al. "Linearized silicon modulator based on a ring assisted Mach Zehnder inteferometer." Optics express 21.19 (2013): 22549-22557.

Extended European Search Report issued Jul. 22, 2022 for EP Application No. 22151735.2, 11 pages.

De Valicourt, Guilhem, et al. "Integrated Hybrid Wavelength-Tunable III-V/Silicon Transmitter Based on a Ring-Assisted Mach-Zehnder Interferometer Modulator" Journal of Lightwave Technology, vol. 36, No. 2, Jan. 15, 2018: 6 pages.

Chang, Chia-Ming, et al. "Differential Microring Modulators for Intensity and Phase Modulation: Theory and Experiments" Journal of Lightwave Technology, vol. 35, No. 15, Aug. 1, 2017: 10 pages.

Office Action issued Jan. 16, 2025 for EP Application No. 22151735.2, 6 pages.

* cited by examiner

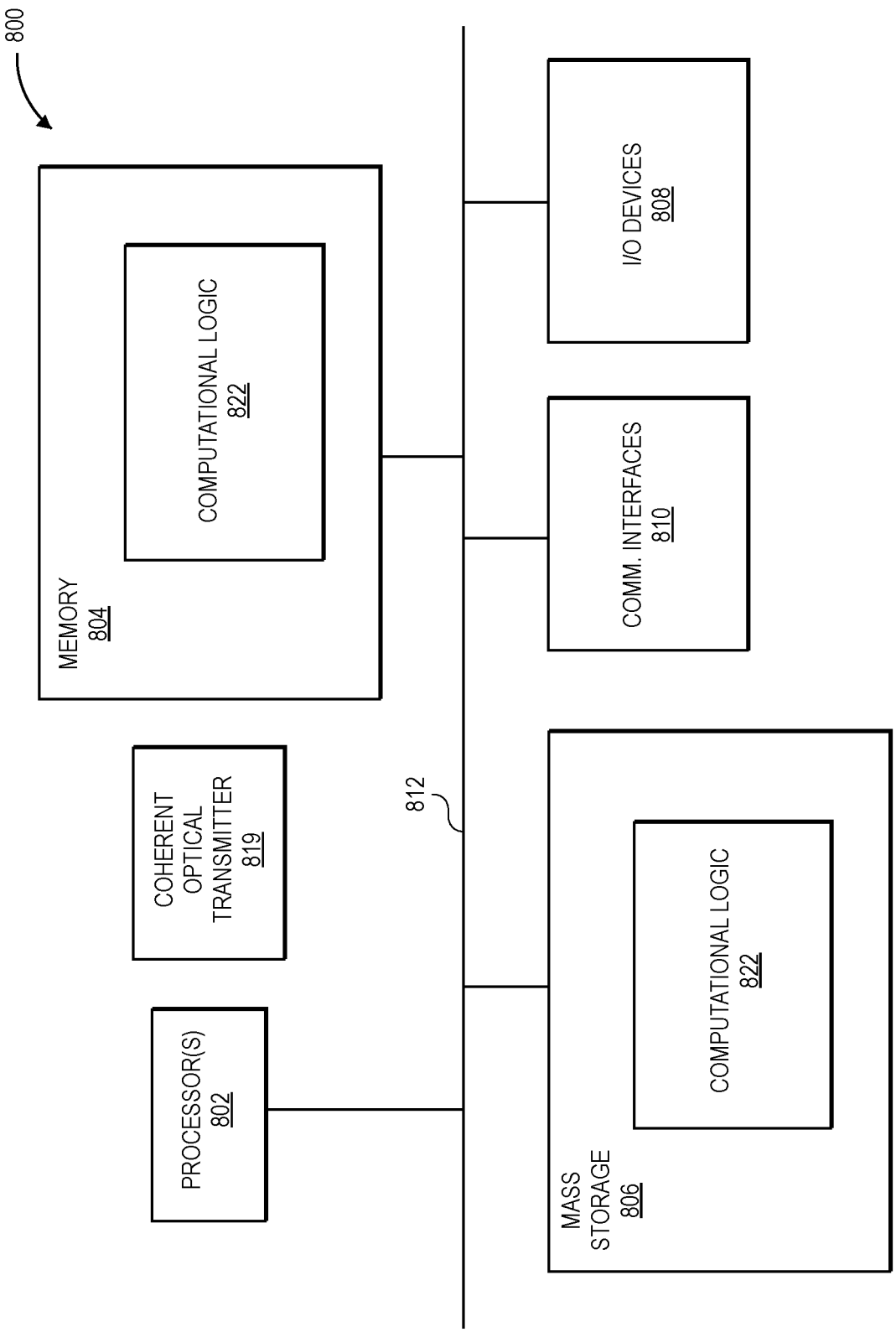

OPTICAL COHERENT TRANSMITTER ON A SILICON CHIP

FIELD

Embodiments of the present disclosure generally relate to the field of photonics devices, and in particular to coherent optical transmitters.

BACKGROUND

Continued growth in virtual machines and cloud computing will continue to increase the demand for increased performance and reduced size of computing devices by integrating photonics-based devices such as optical transmitters.

BRIEF DESCRIPTION OF THE DRAWINGS

FIG. 8 illustrates an example computing device suitable for having various components of FIG. 1-FIG. 7, in accordance with various embodiments.

DETAILED DESCRIPTION

Figure 1:
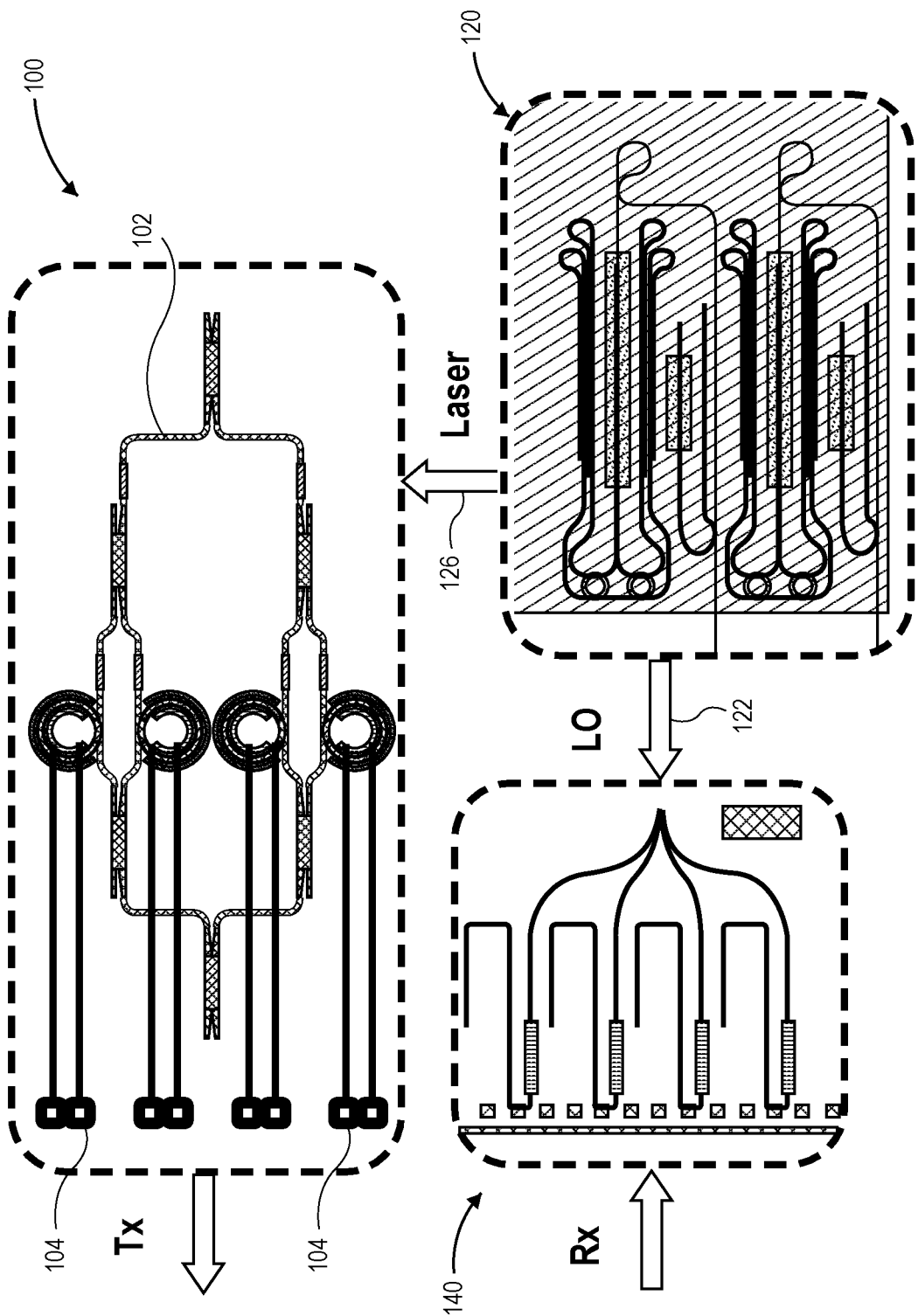
FIG. 1 is a diagram of a mirroring-based an optical coherent modulator integrated with a transmitter, a receiver, and a tunable laser on a silicon chip, in accordance with various embodiments.

Embodiments described herein may be directed to fully integrated optical coherent modulators on a silicon chip. These coherent modulators may be used to enable transmitters, receivers, transceivers, tunable lasers and other optical or electro-optical devices to be integrated on a silicon chip. In embodiments, the optical coherent modulators may include integrated III-V gain components with low loss passive and reconfigurable photonics elements based on thermo-optic tuning. In embodiments, the optical coherent modulators may be based on differential microring modulators that may be nested in a Mach-Zehnder Interferometer (MZI) configuration.

Legacy modulators bear relatively strong chirp. Chirp is a concurrent change in the output phase by amplitude modulation. In modulator embodiments described herein enable low chirp modulation with high sourced laser suppression without the need for high ring modular extinction ratio (ER) or biasing the ring at zero wavelength tuning. In embodiments, there may be a tunable coupler between the microring-based modulator and an input bus waveguide to enable multi-rate coherent modulators.

Embodiments may also be directed to a miniaturized and fully integrated coherent modulators, which can enable terabit per second (Tbps) transceivers in a small form factor based on coherent modulation on a silicon chip. In embodiments, a miniaturized coherent transceiver may integrate with a miniaturized tunable laser source and with a compact coherent in-phase and quadrature (I/Q) modulator based on microring modulator architecture on a silicon chip. Embodiments may substantially reduce the size and power consumption of coherent transmitters, receivers, and/or transceivers in a package.

Legacy coherent modulators are based on integration of individual off-chip components, for example tunable lasers and modulators, and use large footprint Mach-Zehnder modulators (MZMs) that can be several millimeters in length, for example 3 mm to 6.5 mm. This required long length of legacy MZMs for coherent modulators also limits their bandwidth, since the bandwidth is typically determined by the RF loss of the MZMs travelling-wave electrodes at high frequencies, which increases with the modulator length. This, in addition to high-power consumption of legacy MZMs, considerably limits the legacy ability to develop compact wideband and small form factor coherent modulators beyond the current 400 Gbps and 800 Gbps coherent transceivers.

In implementations, the coherent transceiver integrates separate components such as tunable lasers and I/Q modulators, which are also mainly based on legacy MZM, which require a large footprint on chip to provide modulation phase efficiency. This large size of legacy implementations also limits the modulation bandwidth and results in relatively high power consumption. In legacy implementations, microring resonators are used as a miniaturized and lower power alternative to MZM for direct modulation applications; however, their application for coherent modulation has been limited because of their inherent coupled amplitude and phase modulation (i.e., chirp), which creates quality problems in coherent modulation applications. Therefore, legacy microring-based coherent modulators suffer from strong chirp, which make them difficult to use for coherent modulation. Ring modulator assisted MZMs also have been previously proposed for spurious free dynamic range (SFDR) for analog modulation, by cancelling out high-order nonlinear harmonics of ring modulator and MZM. However, this legacy implementation does not affect legacy issues with chirp, and is not applicable to coherent modulation.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an ASIC, an electronic circuit, a processor (shared, dedicated, or group) and/or memory (shared, dedicated, or group) that execute one or more software or firmware programs, a combinational logic circuit, and/or other suitable components that provide the described functionality.

Various Figures herein may depict one or more layers of one or more package assemblies. The layers depicted herein are depicted as examples of relative positions of the layers of the different package assemblies. The layers are depicted for the purposes of explanation and are not drawn to scale. Therefore, comparative sizes of layers should not be assumed from the Figures, and sizes, thicknesses, or dimensions may be assumed for some embodiments only where specifically indicated or discussed.

FIG. 1 is a diagram of a microring-based optical coherent modulator integrated with a transmitter, a receiver, and a tunable laser on a silicon chip, in accordance with various embodiments. The silicon chip represented in FIG. 1 includes a transmitter 100 that includes a microring-based coherent modulator 102, as described in further detail with respect to FIG. 2. The transmitter 100 includes multiple channels 104 that provide optical signal output based upon the microring-based coherent modulator 102. In embodiments, a tunable laser 120 may be split into two waveguides that serve as the modulator input laser 126 and the receiver LO 122. An integrated coherent receiver 140, compromising of integrated 90-degree hybrid photonic circuit and waveguide-integrated photo detectors is used to mix the input received coherent signal with LO signal and generate the received electrical output I and Q signals. The chip of FIG. 1 may be implemented on a silicon on insulator (SOI) silicon platform or any alternative integrated photonic platform, for example Lithium-niobate on isolator material platform.

Embodiments may co-integrate the tunable laser 120 the coherent modulator 102 and transmitter based on a hybrid III-V/Si platform. These embodiments may integrate III/V gain components with low-loss passive and reconfigurable photonic elements using silicon-based thermo-optic tuning and carrier dispersion in forward biased PN junctions to tune the laser wavelength over the target wavelength range. As a result, embodiments may result in both smaller overall footprint and reduced coupling loss between the input laser and coherent modulator through the co-integration of tunable laser with modulator and receiver.

Embodiments may also enable ring-resonator-based I/Q modulators that may use all advantages of ring modulators in term of small footprint, low-power, and wideband modulations (as compared to legacy MZMs). In addition, embodiments may also provide high quality coherent signal and high source laser suppression. The proposed multi-rate modulator may also provide an adaptive modulator configuration, in which the input-waveguide and microring coupling can be adjusted to achieve optimal ring resonator quality factor for the target modulation baud rate, enabling low-power performance over a range of different transceiver data rates.

Figure 2:
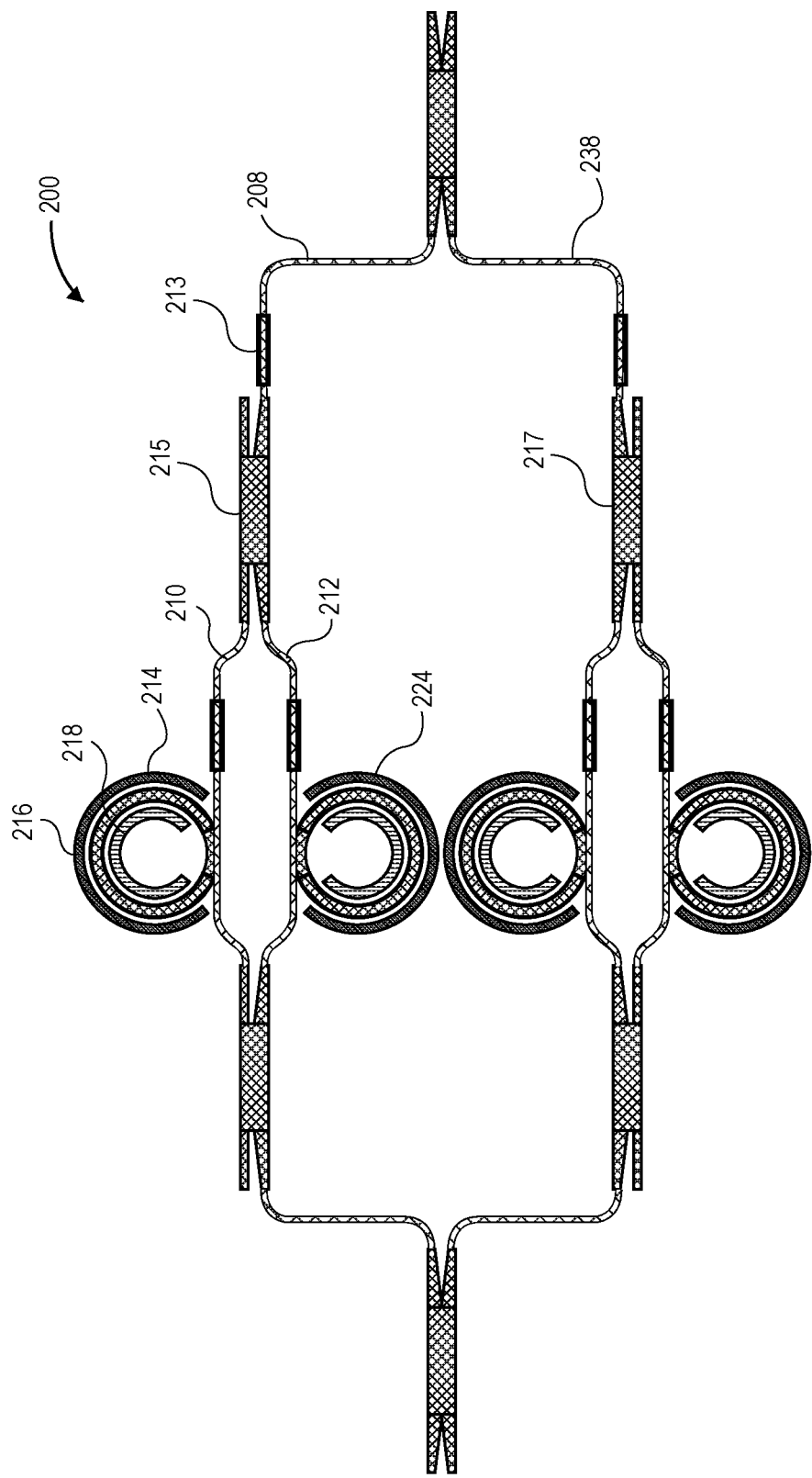
FIG. 2 is a diagram of a ring-resonator based coherent modulator, in accordance with various embodiments.

FIG. 2 is a diagram of a microring-resonator based coherent modulator, in accordance with various embodiments. Resonator-based coherent modulator 200, which may be similar to microring-based coherent modulator 102 of FIG. 1, shows a simplified layout in which a first child modulator 208 and a second child modulator 238, which may be an I modulator or a Q modulator, use a differential MZI architecture with identical microring modulators.

The first child modulator 208 may have a first arm 210 and a second arm 212. The first arm 210 may include a microring 214 coupled with the first arm 210, and the second arm 212 may include a microring 224 coupled with the second arm 212. In embodiments, the first child modulator 208 may use a differential MZI architecture where the microring modulators 214 and 224 are identical. In embodiments, the microring modulators 214, 224 may be initially biased at the same detuning, where the resonators resonate a wavelength based upon an input laser, such as input laser 126 of FIG. 1. Subsequently, the biasing of the microring modulators 214, 224 may be derived differentially by the input RF signal for I and Q modulations 208, 238.

In embodiments, the microring modulator 214 may be integrated with a heater to tune each microring resonator resonance wavelength to bias it at the desired detuning in respect to the input laser wavelength. An outer ring 216 and an inner ring 218 may be split rings that may be electrodes for the modulator and/or contacts for the PN-junction integrated with the ring modulator.

Embodiments may represent a new architecture for coherent modulation based on differential microring modulators 214, 224 nested in a MZI configuration, which enables low chirp modulation with high source laser suppression without the need for high ring modulator extinction ratio (ER) or biasing the ring at zero wavelength detuning. In embodiments, this architecture may also use a tunable coupler 213 between a microring modulator 214, 224 and input bus waveguide 208, to enable multi-rate coherent modulators. This may be used to control the microring resonator and the waveguide coupling through interferometric coupling. This way, the microring overall quality factor can be adjusted to achieve best performance for different modulation rates.

Figure 3A:
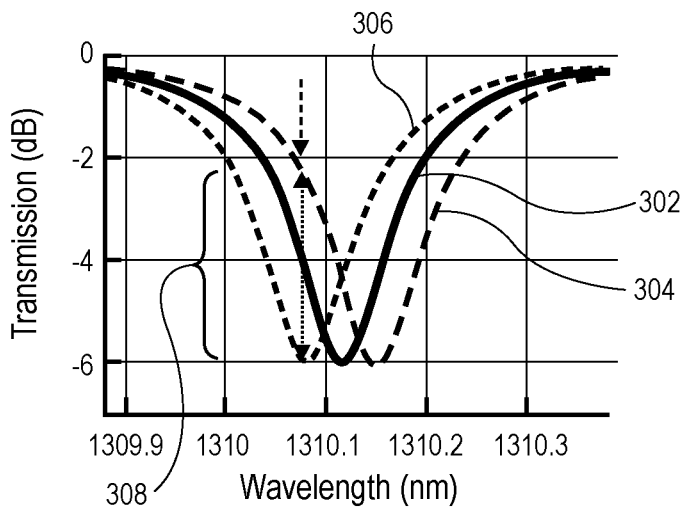
FIGS. 3A-3C are diagrams of two resonator transmission spectra, real and imaginary part of a child modulator as a function of the modulation signal, and an example of a 16-quadrature amplitude modulated (QAM) constellation, in accordance with various embodiments.
Figure 3B:
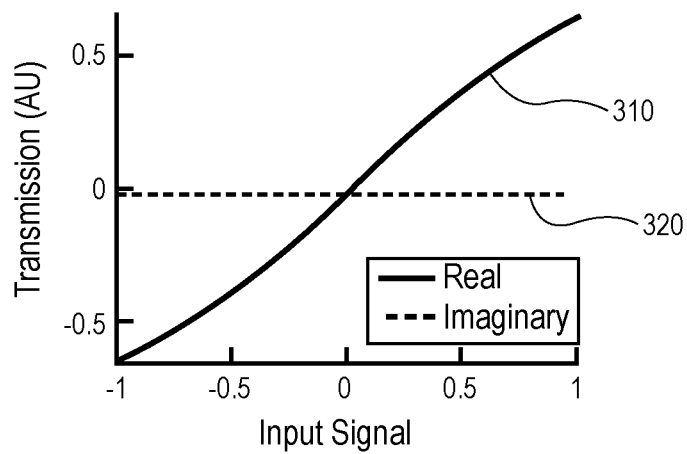
Figure 3C:
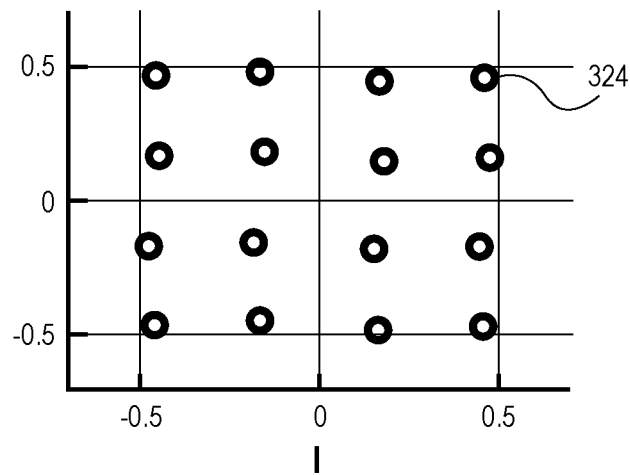

FIGS. 3A-3C are diagrams of two resonator transmission spectra, real and imaginary part of a child modulator as a function of the modulation signal, and an example of a 16-quadrature amplitude modulated (QAM) constellation, in accordance with various embodiments. FIG. 3A shows a graph of transmission in dB against wavelength in nanometers. In particular, the two resonator transmission spectra at zero applied RF signal 302, and when they are differentially derived 304, 306. In addition, the distance 308 shows the differential output of the modulator generated by detuning of the two differentially-drive ring modulators.

The differential configuration of the I and Q modulators allows a high-source laser suppression to be achieved while biasing each resonator at the desired blue detuned wavelength. This mitigates the challenge of the thermal instability with high power input laser when the input laser is biased very close to the microring resonance wavelength as the differential output provides high input laser suppression even at large detuning from the resonance.

Figure 6:
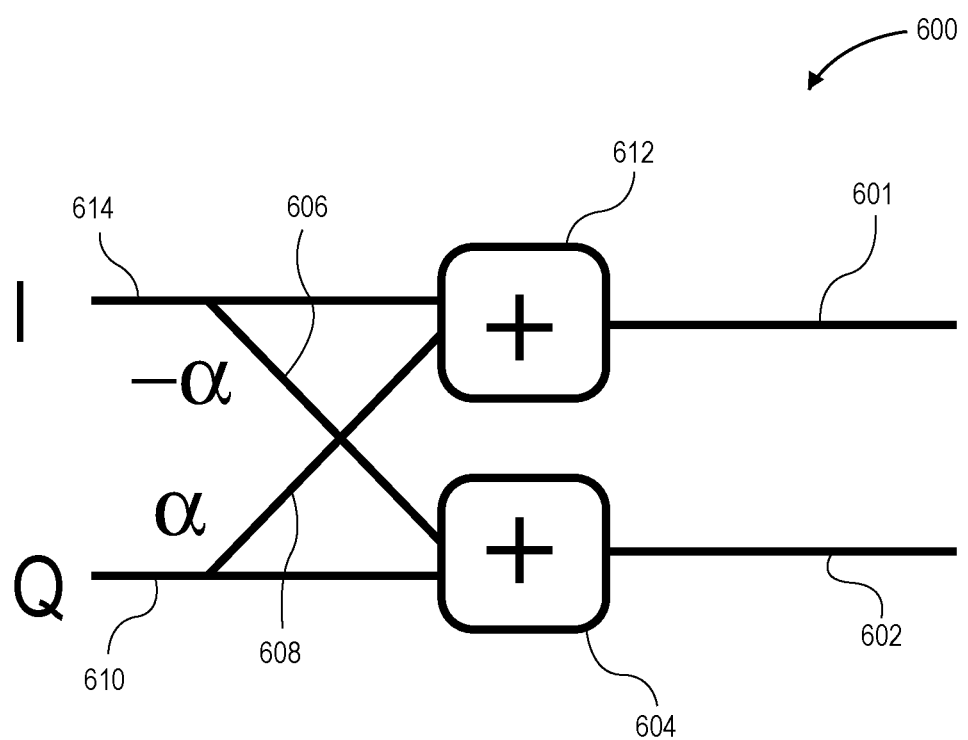
FIG. 6 is a diagram of a chirp pre-correction (equalizer), in accordance with various embodiments.

FIG. 3B shows the response of the real 310 and imaginary 320 part of the child modulator as the function of the modulation signal to the input modulation signal, which shows very small modulation of the output imaginary part, for example small phase modulation, indicating low chirp of the modulator. In embodiments, the coherent modulator can also be accompanied with an equalizer, such as shown in FIG. 6, which in embodiments can effectively remove the residual chirp and lead to a chirp-free coherent modulator. FIG. 3C is an example of a 16 QAM constellation showing an EVM<0.0015 (without equalization). Point 324 on the graph shows an example of the constellation point in the 16-QAM constellation which shows small deviation from ideal 16-QAM constellation. As shown in these figures, high quality coherent modulation with low modulation distortion, for example EVM<0.0015, can be achieved using this modulator architecture.

Figure 4:
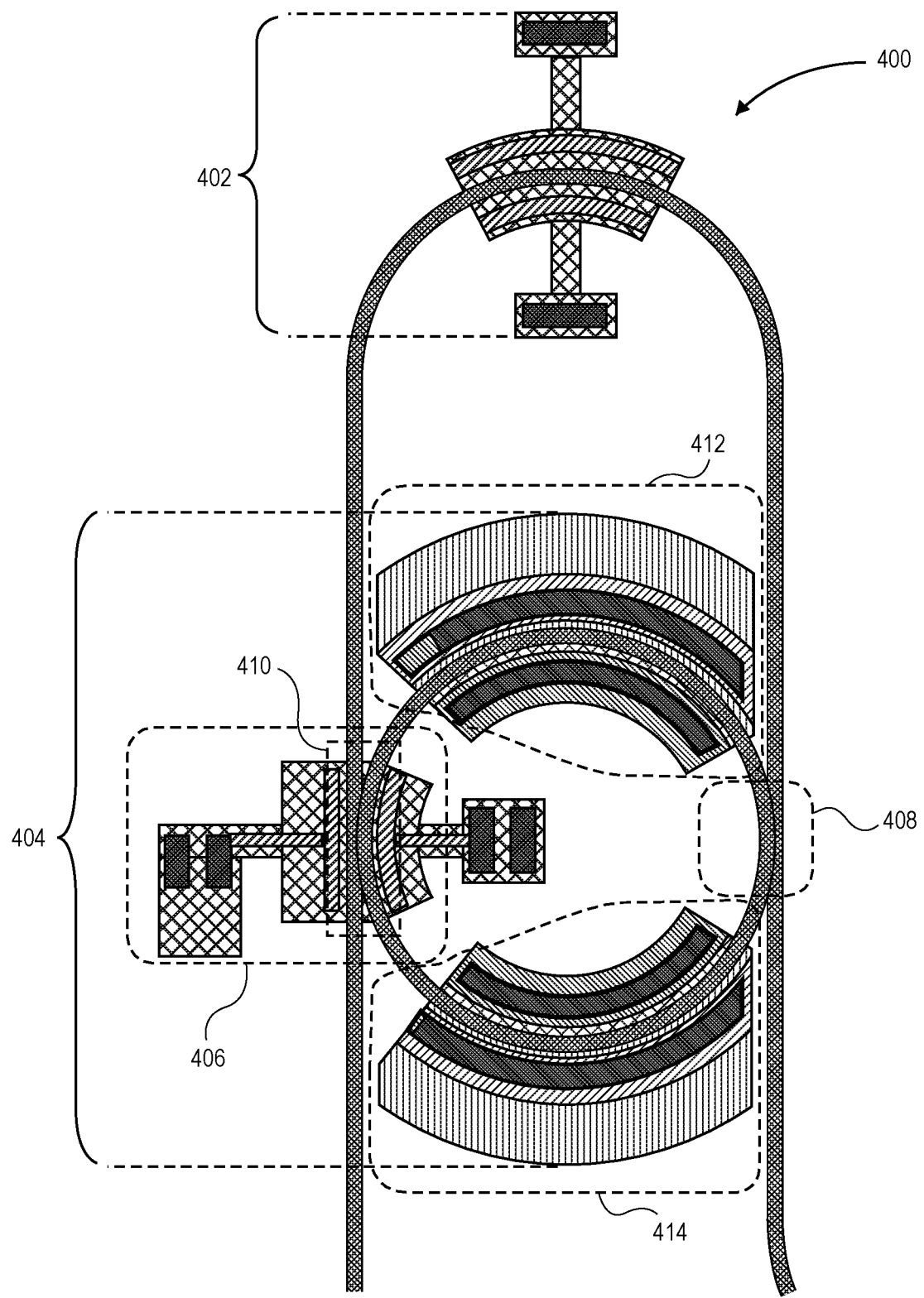
FIG. 4 is a diagram of a reconfigurable modulator, in accordance with various embodiments.

FIG. 4 is a diagram of a reconfigurable modulator, in accordance with various embodiments. Reconfigurable modulator 400 shows a schematic of an embodiment of an architecture for a reconfigurable modulator. The tunable waveguide-resonator coupler includes two segment coupling between the microring and the bus waveguide 404, with a thermal phase shifter 402 between two coupling segments 408, 410, which may also be referred to as coupling sections. In addition, PN junctions 412, 414 may be embedded with the ring resonator. Heater 406 may be used for tuning the microring resonator resonance wavelength. As a result, coherent modulators may be enabled with tunable bandwidth to improve microring quality. In embodiments, the reconfigurable modulator 400 may be implemented in silicon or using silicon components.

Figure 5:
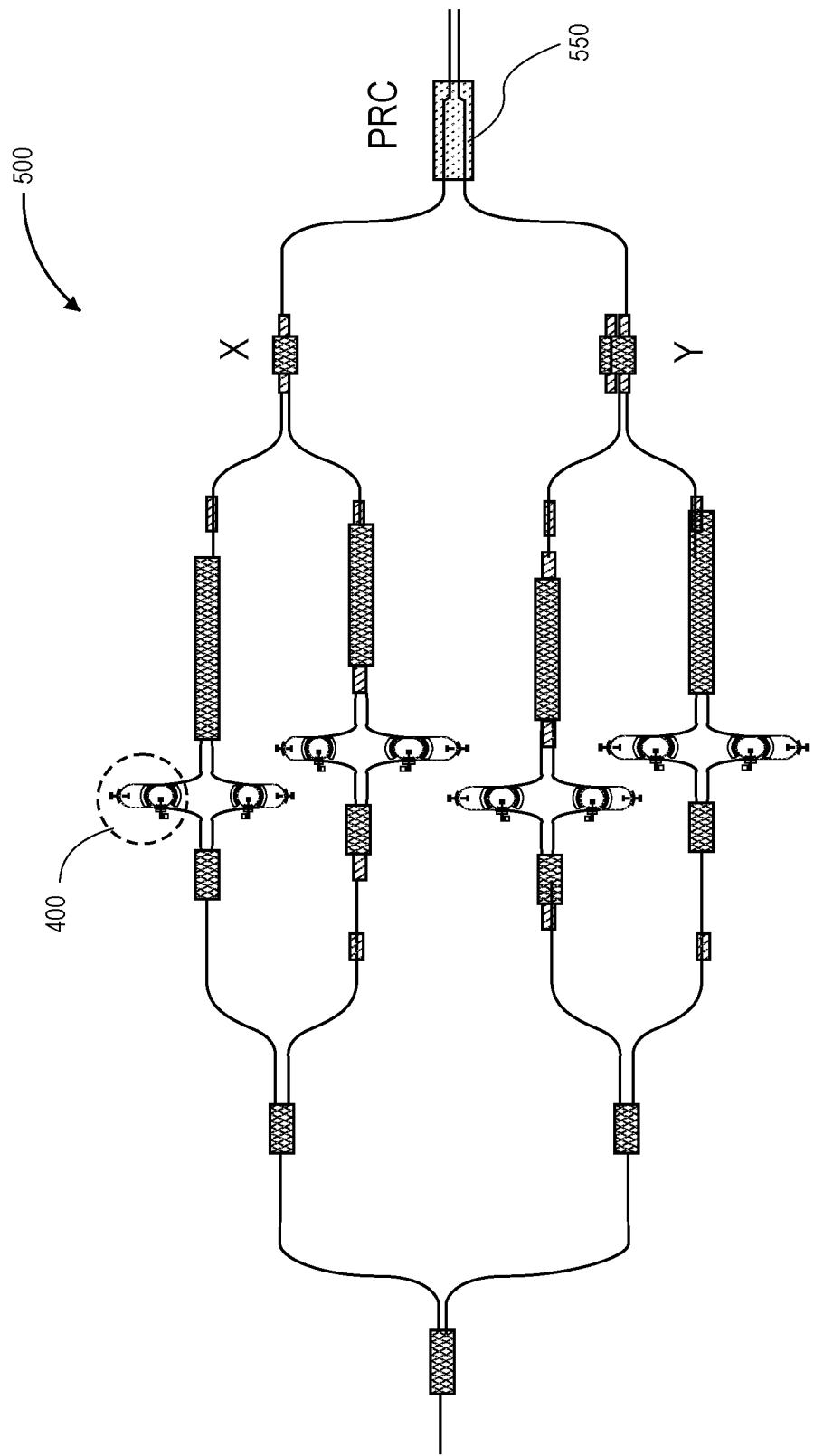
FIG. 5 is a diagram of a full dual-polarization modulator, in accordance with various embodiments.

FIG. 5 is a diagram of a full dual-polarization modulator, in accordance with various embodiments. FIG. 5 shows a schematic 500 of a full dual-polarization modulator based on two modulators that may be similar to the tunable modulator 200 of FIG. 2. A polarization rotator and combiner (PRC) 550 may be used to add the output of the two modulators corresponding to the X and Y polarization to the single output. Reconfigurable modulator 400 may be coupled with the full dual-polarization modulator in one embodiment.

FIG. 6 is a diagram of a chirp pre-correction, in accordance with various embodiments. Diagram 600 shows chirp pre-correction, which may also be referred to as an equalizer, which can compensate for residual chirp of the microring-based coherent modulator by adding some chirp with opposite sign to the I and Q input signal of the coherent modulator. The input I (614) and Q (610) signals are mixed to generate pre-chirp I and Q 601, 602 input signal for the differential microring coherent modulator, to achieve an overall chirp-less output signal. The chirp pre-correction equalizer coefficients 606, 608 are calculated based on the microring modulator parameters.

Figure 7:
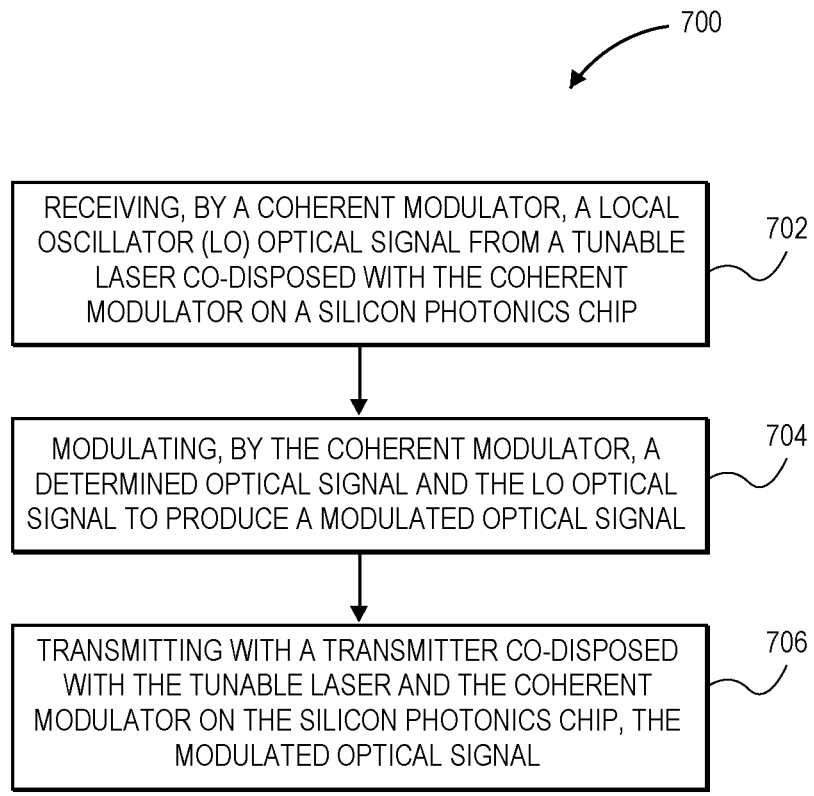
FIG. 7 is a process for coherent optical transmission using an optical coherent modulator, in accordance with various embodiments.

FIG. 7 is a process for coherent optical transmission using an optical coherent modulator, in accordance with various embodiments. Process 700 may be performed using apparatus, processes, techniques, systems, or other disclosures herein, and in particular with respect to FIGS. 1-6.

At block 702, the process may include receiving, by a coherent modulator, a LO optical signal from a tunable laser co-disposed with the coherent modulator on a silicon photonics chip. In embodiments, the microring modulator may be similar to microring-based coherent modulator 102 of FIG. 1, or resonator-based coherent modulator 200 of FIG. 2. In embodiments, the tunable laser may be similar to tunable laser 120 of FIG. 1.

At block 704, the process may further include modulating, by the coherent modulator, a determined optical signal and the LO optical signal to produce a modulated optical signal. In embodiments, the LO optical signal may be similar to the modulator input laser 126 of FIG. 1.

At block 706, the process may further include transmitting with a transmitter co-disposed with the tunable laser and the coherent modulator on the silicon photonics chip, the modulated optical signal. In embodiments, the transmitter may be similar to transmitter 100 of FIG. 1.

FIG. 8 illustrates an example computing device suitable for having various components of FIGS. 1-5, in accordance with various embodiments.

As shown, computing device 800 may include one or more processors or processor cores 802, system memory 804, mass storage 806, communication interfaces 810 and I/O devices 808, coupled with each other via one or more buses/interconnects 812. In various embodiments, at least one of the buses/interconnects 812 is an optical bus/interconnect optically coupling/interconnecting at least two of processors 802, system memory 804, mass storage 806, communication interfaces 810 and I/O devices 808. That is, the at least two of processors 802, system memory 804, mass storage 806, communication interfaces 810 and I/O devices 808 being optically coupled include coherent optical transmitter 819 having one of the embodiments of the coherent optical transmitter earlier described with references to FIGS. 1-5.

For the purpose of this application, including the claims, the terms "processor" and "processor cores" may be considered synonymous, unless the context clearly requires otherwise. The processor 802 may include any type of processors, a microprocessor, and the like. The processor 802 may be implemented as an integrated circuit having multi-cores, e.g., a multi-core microprocessor.

Mass storage devices 806 may be one of diskette, hard drive, volatile memory (e.g., dynamic random-access memory (DRAM), compact disc read-only memory (CD-ROM), digital versatile disk (DVD), and so forth. In general, system memory 804 and/or mass storage devices 806 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

I/O devices 808 may be a display (e.g., a touchscreen display)), keyboard, cursor control, remote control, gaming controller, image capture device, a camera, one or more sensors, and so forth and communication interfaces 810 may include network interface cards, serial buses, modems, infrared receivers, radio receivers (e.g., Bluetooth), and so forth).

The communication interfaces 810 may include communication chips (not shown) that may be configured to operate the device 800 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond.

System buses/Interconnects 812 may include, for example, PCIe buses. In other words, selected ones of processors 802, memory 804, mass storage 806, communication interfaces 810 and I/O devices 808 may be PCIe devices or other serial bus-based devices. In particular, they may be PCIe devices incorporated with the teachings of the present disclosure to couple with or include an optical coherent transmitter on a chip. In the case of multiple buses, they may be bridged by one or more bus bridges (not shown).

Each of these elements may perform its conventional functions known in the art. In particular, system memory 804 and mass storage devices 806 may be employed to store a working copy and a permanent copy of the programming instructions for the operation of various components of computing device 800, including but not limited to an operating system of computing device 800, one or more applications, and/or system software/firmware in support of practice of the present disclosure, collectively referred to as computing logic 822. The various elements may be implemented by assembler instructions supported by processor(s) 802 or high-level languages that may be compiled into such instructions.

The permanent copy of the programming instructions may be placed into mass storage devices 806 in the factory, or in the field through, for example, a distribution medium (not shown), such as a compact disc (CD), or through communication interface 810 (from a distribution server (not shown)). That is, one or more distribution media having an implementation of the agent program may be employed to distribute the agent and to program various computing devices.

The number, capability, and/or capacity of the elements 802, 804, 806, 808, 810, and 812 may vary, depending on whether computing device 800 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, at least one of processors 802 may be packaged together with computational logic 822 configured to practice aspects of embodiments described herein to form a System in Package (SiP) or a System on Chip (SOC).

In various implementations, the computing device 800 may be one or more components of a data center, a laptop, a netbook, a notebook, an ultrabook, a smartphone, a tablet, a personal digital assistant (PDA), an ultra mobile PC, a mobile phone, a digital camera, or an IoT user equipment. In further implementations, the computing device 800 may be any other electronic device that processes data.

Note that Coherent transmitters as described herein may be used within a datacenter or between multiple data centers.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

The following paragraphs describe examples of various embodiments.

EXAMPLES

Example 1 is an apparatus comprising: a tunable laser to output a light beam; a coherent modulator optically coupled with the tunable laser to modulate the light beam; an optical transmitter optically coupled with the coherent modulator to transmit the modulated light beam; and wherein the tunable laser, the coherent modulator, and the optical transmitter are integrated on a silicon photonics chip.

Example 2 includes the apparatus of example 1, further including an optical receiver coupled with the tunable laser to receive another modulated light beam from another silicon photonics chip.

Example 3 includes the apparatus of example 1, wherein the silicon photonics chip is a hybrid III-V/Si photonics chip.

Example 4 includes the apparatus of example 1, wherein the tunable laser is tuned using thermo-optic tuning.

Example 5 includes the apparatus of example 1, wherein the coherent modulator includes differential microring modulators.

Example 6 includes the apparatus of example 5, wherein the differential microring modulators are nested in a Mach-Zehnder Interferometer (MZI) configuration.

Example 7 includes the apparatus of example 1, wherein the coherent modulator includes an I/Q modulator.

Example 8 includes the apparatus of example 7, wherein the I/Q modulator includes a ring-resonator-based I/Q modulator.

Example 9 includes the apparatus of example 1, further includes a tunable coupler optically coupled with and disposed between the modulator and an input bus waveguide to enable multi-rate coherent modulation.

Example 9A includes the apparatus of any one of examples 1-9, wherein the apparatus or a portion of the apparatus is implemented via silicon.

Example 10 is a method for coherent optical transmission, the method comprising: receiving, by a coherent modulator, a local oscillator (LO) optical signal from a tunable laser co-disposed with the coherent modulator on a silicon photonics chip; modulating, by the coherent modulator, a determined optical signal and the LO optical signal to produce a modulated optical signal; and transmitting with a transmitter co-disposed with the tunable laser and the coherent modulator on the silicon photonics chip, the modulated optical signal.

Example 11 includes a method of example 10, further comprising tuning the tunable laser using thermo-optic tuning.

Example 12 includes the method of example 11, wherein the coherent modulator is a resonator-based coherent modulator with each I or Q modulator using a differential MZI architecture.

Example 13 includes the method of example 12, wherein the differential MZI architecture uses identical microring modulators in each arm.

Example 14 includes the method of any one of examples 10-13, wherein identical microring modulators include two microring resonators.

Example 15 is a system comprising: an apparatus comprising: a tunable laser to output a light beam; a coherent modulator optically coupled with the tunable laser to modulate the light beam; an optical transmitter optically coupled with the coherent modulator to transmit the modulated light beam; and wherein the tunable laser, the coherent modulator, and the optical transmitter are integrated on a silicon photonics chip; and an optical waveguide coupled with an optical output of the optical transmitter to transmit the modulated light beam to another device.

Example 16 includes the system of example 15, wherein the optical waveguide is a selected one of: one or more optical fibers or a silicon waveguide.

Example 17 includes the system of example 15, wherein the coherent modulator includes differential microring modulators.

Example 18 includes the system of example 17, wherein the differential microring modulators are nested in a Mach-Zehnder Interferometer (MZI) configuration.

Example 19 includes the system of example 15, wherein the coherent modulator includes an I/Q modulator.

Example 20 includes the system of example 19, wherein the I/Q modulator includes a ring-resonator-based I/Q modulator.

Example 21 includes the system of any one of examples 15-20, wherein the coherent modulator is a dual polarization coherent modulator.

Example 22 includes a system of any one of examples 15-20, wherein the system further includes a chirp pre-correction I/Q equalizer to further reduce overall modulator chirp.

What is claimed is:

1. An apparatus, comprising:
a tunable laser to output a light beam; and
a coherent modulator coupled to the tunable laser to modulate the light beam, wherein the tunable laser and the coherent modulator are integrated on a silicon photonics chip, and the coherent modulator comprises:
an input waveguide coupled to the tunable laser;
first and second arms coupled to the input waveguide;
a first microring modulator coupled to the first arm and comprising first and second respective coupling segments and a respective thermal phase shifter between the first and second respective coupling segments; and
a second microring modulator coupled to the second arm and comprising first and second respective coupling segments and a respective thermal phase shifter between the first and second respective coupling segments; wherein the input waveguide is a first input waveguide, and the apparatus further comprises:
a second input waveguide coupled to the tunable laser;
third and fourth arms coupled to the second input waveguide;
a third microring modulator coupled to the third arm and comprising first and second respective coupling segments and a respective thermal phase shifter between the first and second respective coupling segments; and
a fourth microring modulator coupled to the fourth arm and comprising first and second respective coupling segments and a respective thermal phase shifter between the first and second respective coupling segments.

2. The apparatus of claim 1, further including an optical receiver coupled to the tunable laser, wherein an output of the tunable laser is split into a first waveguide that serves as an input to the coherent modulator and a second waveguide that serves as a local oscillator (LO) optical signal for the optical receiver.

3. The apparatus of claim 1, wherein the silicon photonics chip is a hybrid III-V/Si photonics chip.

4. The apparatus of claim 1, wherein the tunable laser is tuned using thermo-optic tuning.

5. The apparatus of claim 1, wherein the first and second microring modulators are nested in a Mach-Zehnder Interferometer (MZI) configuration.

6. The apparatus of claim 1, wherein the coherent modulator comprises an I/Q modulator.

7. The apparatus of claim 1, further comprising a tunable coupler between the modulator and an input bus waveguide.

8. The apparatus of claim 1, wherein the coherent modulator is a dual polarization coherent modulator.

9. A method for coherent optical transmission, the method comprising:
receiving, by a coherent modulator, an optical signal from a tunable laser co-disposed with the coherent modulator on a silicon photonics chip, wherein the coherent modulator includes a differential microring modulator;
mixing I and Q signals of the optical signal to generate pre-chirp I and Q input signals, respectively, for the coherent modulator;
modulating, by the coherent modulator, the pre-chirp I and Q input signals to produce a modulated optical signal; and
transmitting the modulated optical signal.

10. The method of claim 9, further comprising tuning the tunable laser using thermo-optic tuning.

11. The method of claim 10, wherein the coherent modulator is a resonator-based coherent modulator with each I or Q modulator using a differential Mach-Zehnder Interferometer (MZI) architecture.

12. The method of claim 11, wherein the differential MZI architecture uses microring modulators in each arm.

13. The method of claim 9, wherein the mixing includes adding a chirp of opposite sign to the I and Q signals of the optical signal.

14. A system, comprising:
a tunable laser to output a light beam;
an optical transmitter comprising a coherent modulator, wherein the coherent modulator comprises differential microring modulators and is coupled to the tunable laser to modulate the light beam; and
a chirp pre-correction I/Q equalizer to reduce a chirp of the coherent modulator, wherein the tunable laser and the optical transmitter are integrated on a silicon photonics chip, wherein coefficients of the chirp pre-correction I/Q equalizer are based on parameters of the differential microring modulators.

15. The system of claim 14, further comprising an optical waveguide coupled with an optical output of the optical transmitter to transmit the modulated light beam, wherein the optical waveguide comprises at least one of an optical fiber or a silicon waveguide.

16. The system of claim 14, wherein the differential microring modulators are nested in a Mach-Zehnder Interferometer (MZI) configuration.

17. The system of claim 14, wherein the coherent modulator comprises an I/Q modulator.

18. The system of claim 14, wherein the coherent modulator is a dual polarization coherent modulator.

* * * * *